United States Patent [19]
Busch

[11] 3,744,747
[45] July 10, 1973

[54] RESILIENT SUPPORT
[75] Inventor: Richard E. Busch, Hacienda Heights, Calif.
[73] Assignee: Addmaster Corporation, San Gabriel, Calif.
[22] Filed: May 15, 1972
[21] Appl. No.: 253,499

[52] U.S. Cl.................................. 248/22, 248/24
[51] Int. Cl........................................... B62d 23/00
[58] Field of Search.................. 248/22, 24, 358 R, 248/15, 9, 21, 350; 267/153

[56] References Cited
UNITED STATES PATENTS
1,587,484   6/1926   Holden ............................ 248/22
1,834,450   12/1931  Flintermann..................... 248/22

FOREIGN PATENTS OR APPLICATIONS
844,598   7/1952   Germany ........................... 248/22
584,991   1/1947   Great Britain ................. 248/358 R Primary Examiner—J. Franklin Foss
Attorney—Fred N. Schwend

[57] ABSTRACT

A vibration absorbing support comprising a base having an upstanding post and a concentrically arranged flange surrounding the post with radially extending upstanding ribs therebetween. An annular elastomeric bushing is slidably fitted between the post and the flange and rests on the ribs. The bushing supports a base for a vibrating apparatus in such a manner that the elastomeric material is subjected to a shearing force in a vertical direction and a compressive force in a horizontal direction to permit a maximum amplitude of movement vertically and a restricted horizontal movement.

11 Claims, 6 Drawing Figures

PATENTED JUL 10 1973 3,744,747

RESILIENT SUPPORT

BACKGROUND OF THE INVENTION

1. Field of the Invention

This invention relates to resilient supports and has particular reference to means for supporting and absorbing the relatively low frequency vibrations transmitted by motor operated mechanisms, such as those found in business machines and the like.

2. Description of the Prior Art

Business machines, such as calculators, printers, adding machines and the like, generally incorporate motor driven mechanisms of a vibratory nature. Although resilient elastomeric supports have been employed heretofore for supporting the motor driven mechanisms of such machines most such supports maintain the elastomeric material under compressive stress. Since the material is largely compressed initially by the weight of the vibratory apparatus, it may not permit sufficient vertical movement to adequately dampen out relatively low frequency vibrations with the result that such vibrations may be transmitted to the supporting surface. Although some such supports have been developed which utilize the shear characteristics of the material they are generally complicated, expensive or ineffective to completely dampen all vibrations transmitted thereto.

On the other hand, it is often necessary to restrict movement of the resiliently supported apparatus in a lateral or horizontal plane to prevent the same from stricking adjacent portions of the machine housing or adjacent non-vibratory parts of the apparatus which may be supported in fixed position within the housing. For this reason, many such prior machines require special restraining or hold-down devices to be attached to the resiliently supported mechanism during shipment to avoid damage to the parts thereof when subject to excessive shocks which are often incurred.

SUMMARY OF THE INVENTION

According to the present invention, a simple and inexpensive resilient support is provided, incorporating an elastomeric material which supports the vibratory device under shear stress in a vertical direction and absorbs horizontally transmitted vibrations under compressive stress. The support is compact, easy to assemble, capable of withstanding high impact shocks and provides a positive stop to limit over extension in the event of overload in a downward direction. Another stop limits excessive movement in the opposite direction.

Accordingly, a principal object of the invention is to provide an improved resilient support for a vibratory apparatus, such as the motor driven parts of a business machine.

Another object is to provide a resilient support for a vibratory apparatus which will adequately absorb relatively low frequency vibrations.

Another object is to provide a simple elastomeric support in which the elastomeric material is loaded under shear stress in a vertical direction and under compressive stress in a horizontal direction.

Another object is to eliminate the need for special restraining devices when shipping business machines or the like incorporating resiliently supported motor driven apparatus.

The manner which the above and other objects of the invention are accomplished will be readily understood on reference to the following specification when read in conjunction of the accompanying drawings.

DESCRIPTION OF THE PREFERRED EMBODIMENT

Figure 1:
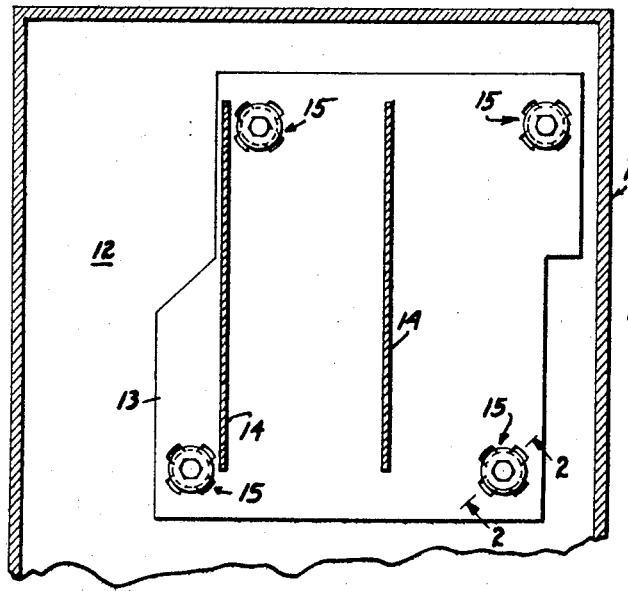
FIG. 1 is a sectional plan view illustrating part of the housing and a mounting plate for the motor driven parts of a business machine, embodying a preferred form of the present invention.
Figure 3:
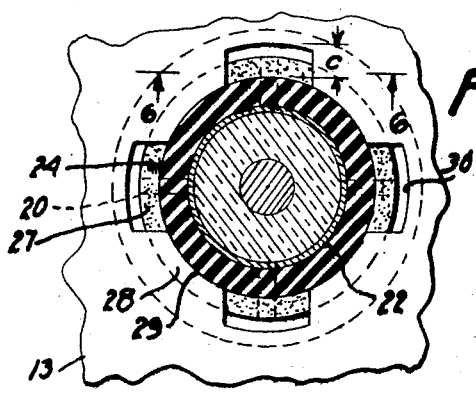
FIG. 3 is a sectional plan view taken along line 3—3 of FIG. 2.
Figure 4:
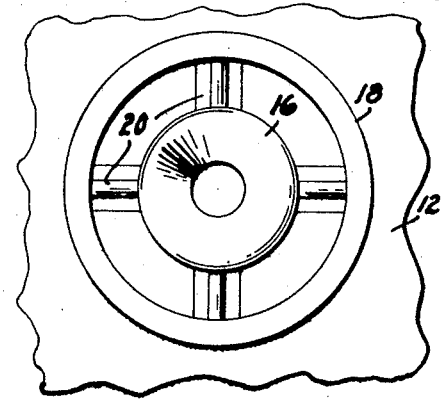
FIG. 4 is a plan view of the support boss with the elastomeric bushing, mounting plate, etc., removed.
Figure 2:
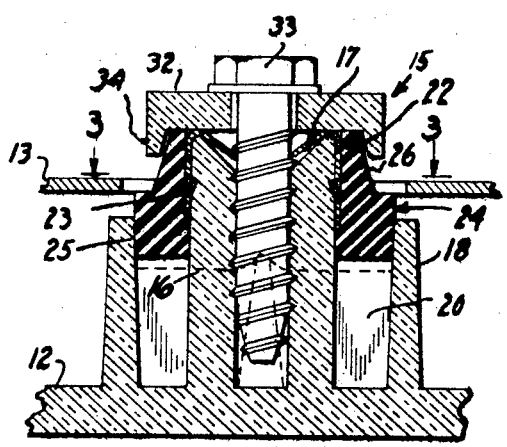
FIG. 2 is an enlarged sectional view of one of the vibration absorbing supports and is taken along line 2—2 of FIG. 1.
Figure 5:
FIG. 5 is a side view of the elastomeric bushing.

Referring in particular to FIG. 1, the invention is illustrated as being embodied in a business machine which is contained in a suitable molded plastic housing, generally indicated at 11, having a bottom or base wall 12. The latter may have suitable supporting feet (not shown) for mounting on a supporting surface. A plate 13 of sheet metal and carrying sapced upright walls 14 is supported from the bottom wall by vibration absorbing supports generally indicated at 15. The plate 13 carries a vibratory mechanism (not shown) such as a motor driven printer which may cooperate with other devices (not shown) also suitably pported by the housing independently of the plate 13.

Figure 6:
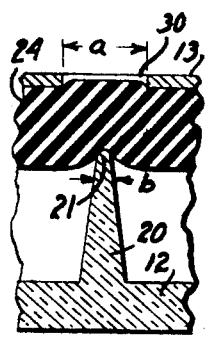
FIG. 6 is a fragmentary sectional view taken substantially along the lines 6—6 of FIG. 3.

Referring now to FIGS. 2 to 6, each vibration absorbing support 15 comprises an upstanding tubular post 16 formed integrally with the bottom wall 12 of the housing and terminating in an upper inverted conical endface 17. An annular flange 18 is also formed integral with the bottom wall 12. The latter extends concentrically of the post 16 but terminates below the upper end thereof. Four radially extending ribs 20 extend upwardly from the bottom wall 12 and terminate below the upper edge of the annular flange 18. Such ribs are triangular in cross-section, as seen in FIG. 6, and each terminates in an upper rounded tip 21. Such ribs are integral with the post 16 and flange 18.

A thin walled metal cup-shaped member 22 is pressed over the upper end of the post 16 and has inwardly extending barbs 23 which, when the member 22 is forced over the post, embed into the plastic material and thus lock the member from being removed. The member 22 has an inverted conical end which is screw-threaded.

A relatively soft elastomeric bushing, generally indicated at 24, is slidably mounted on the member 22 and post 16. The bushing 24 has a large diameter lower section 25 which is also slidable vertically within the upper end of the flange 18 and has a smaller diameter conical upper section 26. An annular shoulder 27 is formed intermediate the sections 25 and 26 to support the plate 13. For this purpose, the plate 13 has a generally circular hole formed in alignment with each bushing 24. Such opening has four spaced lands 28 forming circular edges 29 having substantially the same diameter as the lower portion of the conical section 26 of the bushing 24. Four cut-out portions 30 are interspersed between the lands 28.

It will be noted that the width (a), FIG. 6, of each cut-out portion 30 is considerably greater than the tip (b) of the underlying support rib 20. Also, the thickness (c) of each cut-out portion 30 is greater than the radial thickness of the annular shoulder 27 of the bushing 24 so as to extend beyond the outer periphery of the bushing. Also, the cut-out portions 30 are so oriented on the plate 13, that when the latter is fitted over the bushings 24, the cut-out portions are aligned with the tips 21 of the ribs 20 and extend equally on opposite sides thereof.

It will be further noted that the plate 13 merely rests on the various bushings 24 and the lands 28 are the only parts of the plate 13 which are supported by the bushings 24.

Under normal load conditions, as depicted in FIG. 6, the ribs 20 indent somewhat into the body of the elastomeric material of the bushings 24 and a small portion of such material is extended into the aligned cutout portions 30. Thus, the elastomeric material is placed solely under shear stress by the weight of the supported apparatus which utilizes the best vibration absorbing characteristics of the material and permits a considerable amplitude of movement of the plate 13 in a vertical direction due to vertical vibrations. However, upon overloading, as may occur if the machine is dropped, the plate 13 will arrest against the upper edge of the flange 18.

It will be noted that any horizontal vibrations imparted to the plate 13, will be absorbed by the upper conical sections 26 of the bushings 24 which, in this case, are placed under compressive stress, thus restricting the plate to a relatively small amplitude of movement horizontally to prevent parts of the vibratory apparatus supported by the plate 13 from striking the sides of the housing or from striking assocaited devices which may be independently supported within the housing 11.

In order to prevent the plate 13 from being dislodged from the bushings 24 in the event the machine is overturned, a retainer or snubber disc 32 is mounted on top of each post 16 and is retained thereon by a clamp screw 33. The latter is of the self-threading type and is threaded through both the threaded portion of the cap member 22 and the interior of the post 16. During threading, the sides of the cap member 22 constrain the post 16 from being expanded radially due to possible excessive radial forces developed by the clamp screw 33.

The disc 32 has a downwardly extending annular lip 34 which surrounds the upper portion of the bushing 24 and positively limits upward movement of the plate 13.

The upper conical section 26 of the bushing 24 facilitates assembly of the plate 13 over the bushing.

It will be noted that the integrally united post 16, ribs 20 and surrounding annular flange 18 form a rigid support to resist breaking or yielding in the event the machine is dropped on its side or otherwise violently jarred in a horizontal direction.

Although the vibration absorbing supports 15 may be made in different sizes and proportions, it has been found that such supports, when made in the proportions shown in the drawings and comprising bushings having an outside diameter of approximately three quarters of an inch and formed of rubber having a hardness of approximately 40, shore, are adapted to satisfactorily support most driven business machine mechanisms and to absorb any normal vibrations therefrom.

I claim:

1. A vibration absorbing support for a vibratory device comprising
    a base,
    an upstanding post on said base,
    upstanding ribs extending radially relative to said post,
    an annular bushing of elastomeric material surrounding said post and resting on said ribs, and
    a supporting element for said vibratory device,
    said supporting element resting on said bushing and having an opening surrounding said post,
    the edges of said opening having portions fitting the side of said bushings, and
    said opening having portions located in vertical alignment with respective ones of said ribs.

2. A vibration absorbing support according to claim 1 wherein said bushing is slidable along said post.

3. A vibration absorbing support according to claim 1 wherein said bushing comprises
    a large diameter section adjacent the lower end thereof and
    a small diameter section adjacent the upper end thereof,
    said bushing having an annular shoulder intermediate said sections,
    said opening fitting over said small diameter section and the portion of said element surrounding said opening resting on said annular shoulder.

4. A vibration absorbing support according to claim 1 comprising an upstanding annular flange on said base and surrounding said ribs,
    said flange extending concentrically of said post and adapted to arrest said supporting element upon downward displacement of said supporting element beyond a predetermined amount relative to said base.

5. A vibration absorbing support according to claim 4 wherein said ribs are integral with said post and said annular flange.

6. A vibration absorbing support according to claim 1 comprising
    a snubber member on said post,
    said snubber member retaining said bushing on said post and engageable by said supporting element upon upward displacement of said supporting element beyond a predetermined amount relative to said base.

7. A vibration absorbing support according to claim 6 comprising a screw threaded axially into said post for securing said snubber member to the top of said post.

8. A vibration absorbing support according to claim 3 wherein said upper diameter section of said bushing is conical and has its largest diameter portion adjacent said annular shoulder.

9. A vibration absorbing support according to claim 7 wherein said base and said post are molded of plastic, comprising an inverted cup shaped member of metal surrounding said post, said cup shaped member being screw-threaded to threadably receive said screw.

10. A vibration absorbing support according to claim 9 wherein
    said supporting element comprises
    a horizontally extending plate of sheet metal.

11. A vibration absorbing support for a vibratory device comprising
   a base,
   an annular flange upstanding from said base,
   upstanding ribs on said base extending radially within said flange,
   an annular bushing of elastomeric material,
   said bushing having a large diameter lower section slidable in said flange and a small diameter upper section,
   said bushing having an annular shoulder intermediate said sections,
   a horizontally extending support plate for supporting said vibratory device,
   said plate having an opening therein fitted over said small diameter section of said bushing,
   a portion of said plate surrounding said opening resting on said annular shoulder, and
   said opening having portions in vertical alignment with respective ones of said ribs.

* * * * *